Figure 1:
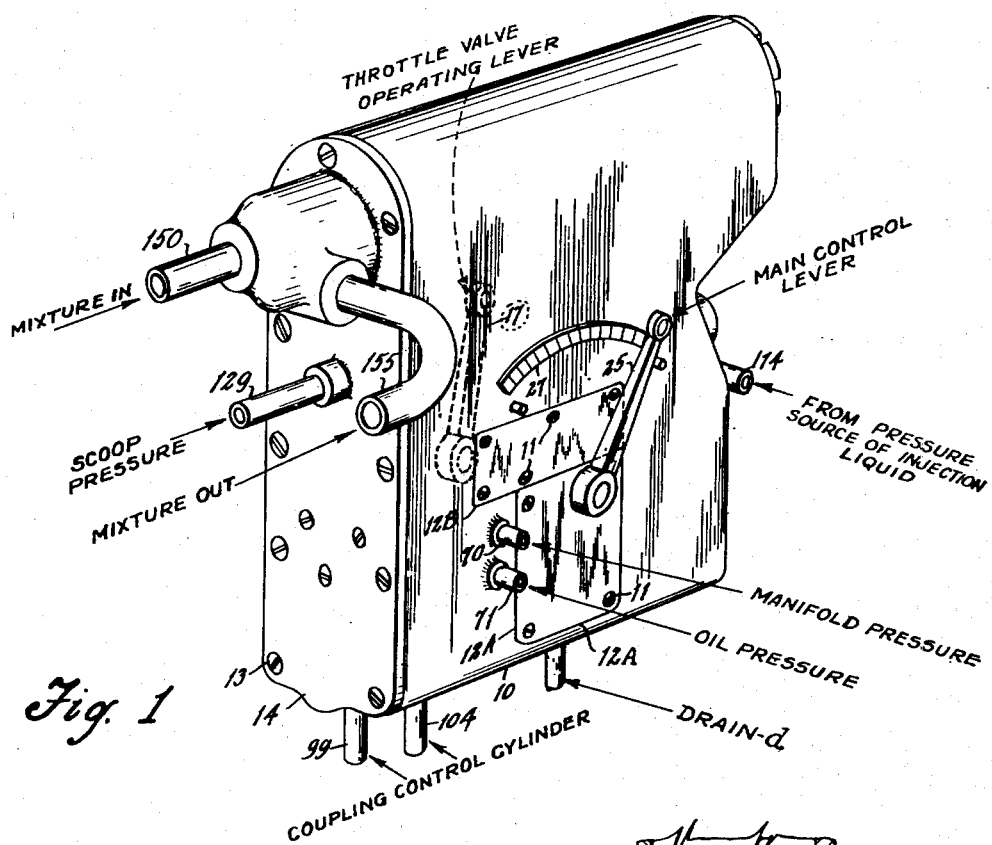

Aug. 14, 1951　　　F. W. KERFOOT　　　2,563,823
ENGINE PRESSURE CONTROL
Filed June 21, 1946　　　　　　　　　　　　　　　2 Sheets-Sheet 1

INVENTOR.
Frank W. Kerfoot
BY
Spencer Hardman & Fer
his attorneys

Aug. 14, 1951 F. W. KERFOOT 2,563,823
ENGINE PRESSURE CONTROL
Filed June 21, 1946 2 Sheets—Sheet 2
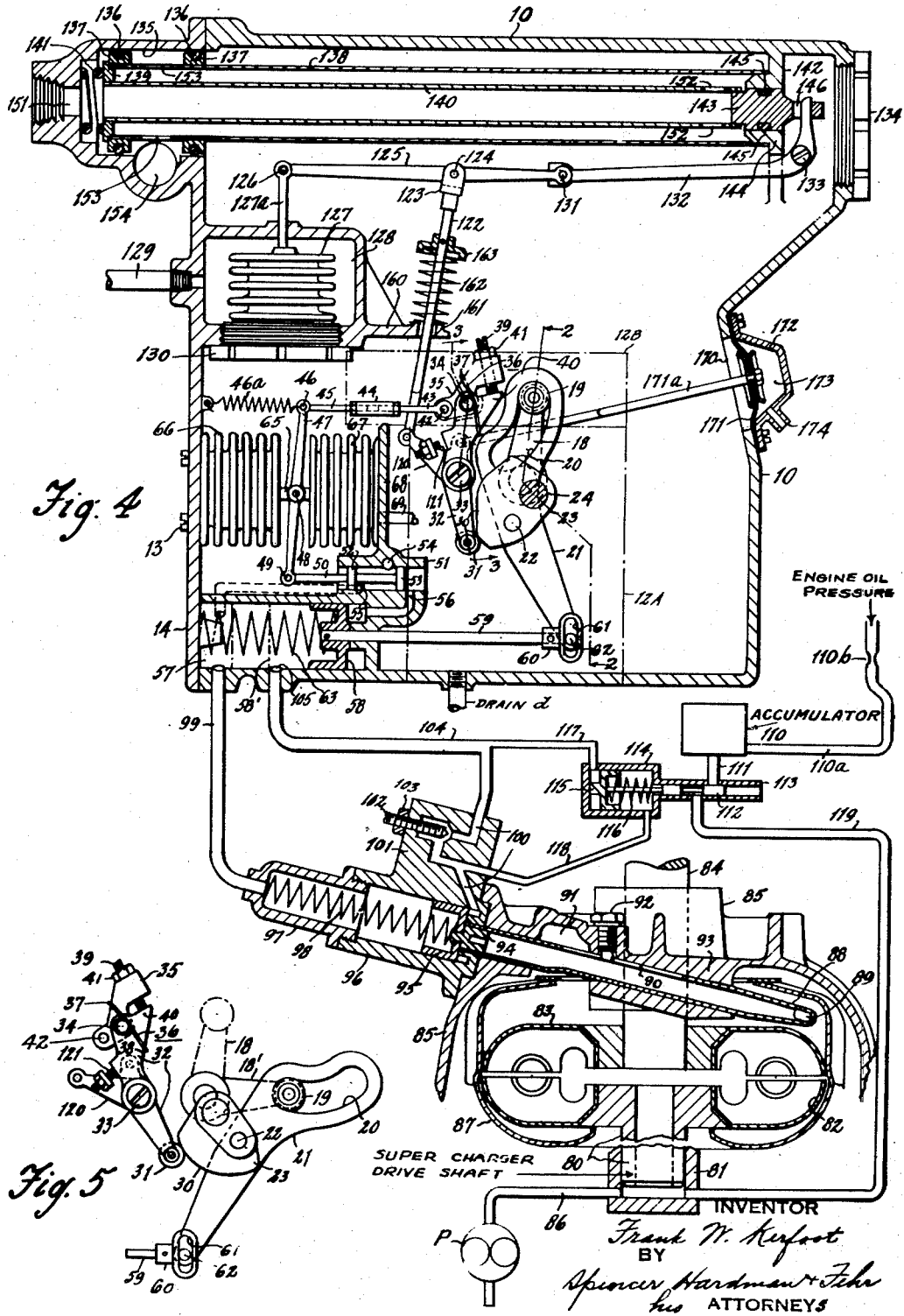
INVENTOR
Frank W. Kerfoot
BY
Spencer Hardman & Fehr
his ATTORNEYS Patented Aug. 14, 1951

2,563,823

UNITED STATES PATENT OFFICE 2,563,823

ENGINE PRESSURE CONTROL

Frank W. Kerfoot, Stamford, Conn., assignor to General Motors Corporation, Detroit, Mich., a corporation of Delaware Application June 21, 1946, Serial No. 678,510

18 Claims. (Cl. 123—103)

1

This invention relates to manifold pressure regulation for supercharged internal combustion engines such as used on aircraft.

An object of the invention is to provide for the manual control of pressure selection in combination with automatic means under control of altitude-pressure or under control of the temperature of the fuel mixture or under joint control of altitude pressure and fuel mixture temperature for limiting the extent to which engine intake pressure can be raised so that detonation will be avoided, and to provide means for rendering the pressure limiting means non-effective when liquid injection is used to reduce the temperature of the fuel mixture.

A further object of the invention is to provide for intake pressure regulation for an engine having main and auxiliary superchargers, the main supercharger being driven directly by the engine and the auxiliary supercharger operating normally at a minimum speed through a variable speed drive while the main supercharger is capable of supplying the demanded pressure after which the auxiliary supercharger speed is increased in order that demanded pressure may be maintained at altitudes above that which are critical for operation with the main supercharger alone. In the disclosed embodiment of the present invention, the variable speed drive for the auxiliary supercharger is under control by the pressure regulator. The control is such that when critical altitude for main supercharger operation alone is reached, the pressure regulator causes the speed of the auxiliary supercharger to be increased in order to meet the demand for pressure at altitudes above said critical altitude.

Further objects and advantages of the present invention will be apparent from the following description, reference being had to the accompanying drawings, wherein a preferred embodiment of the present invention is clearly shown.

In the drawings:

Fig. 1 is a perspective view of a pressure regulator unit embodying the present invention.

Figure 2:
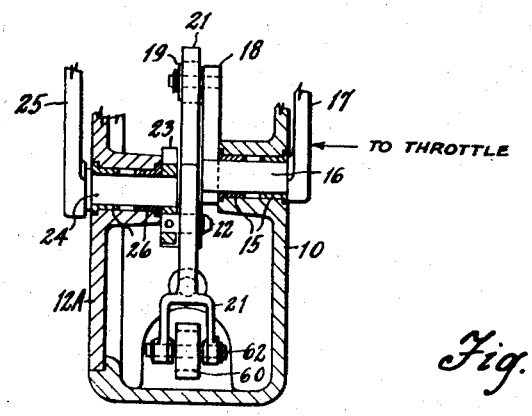
Figure 3:
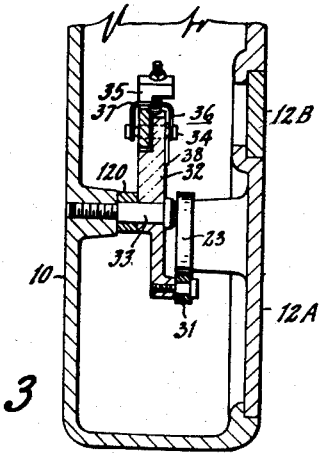

Figs. 2 and 3 are sectional views taken respectively on the lines 2—2 and 3—3 of Fig. 4.

Fig. 4 includes longitudinal sectional views of the pressure regulator and auxiliary supercharger speed controller and a diagram of connections.

Fig. 5 is a fragmentary view showing parts of the pressure regulator in positions different from those appearing in Fig. 4.

The pressure regulator, shown in Fig. 1, comprises a case 10 to which screws 11 secure side cover sections 12A and 12B and to which screws 13

2 secure an end cover plate 14. Referring to Fig. 2, it will be seen that case 10 provides bearings 15 for a shaft 16 to which is secured a lever 17 to be connected with the engine throttle valve not shown. Shaft 16 is connected also with a lever 18 carrying a roller 19 received in a cam slot 20 of a lever 21 pivotally supported by a pin 22 carried by a cam plate 23 (Fig. 4) which is attached to a shaft 24 attached to a main control lever 25 which is manually operated. Shaft 24 is journaled in bearings 26 provided by the cover plate 12A. Since the lever 25 (Fig. 1) is used to select the pressure to be maintained by the pressure regulator, the positions of lever 25 may be designated by a scale 27 graduated to reach absolute pressure in inches of mercury.

The selection of pressures by lever 25 is effected by the cam surface 30 of the plate 23 (Fig. 4). Surface 30 is engaged by a roller 31 carried by lever 32 which is pivotally supported by a screw 33 (Fig. 3) attached to the case 10. Lever 32 carries a pin 34 pivotally supporting a lever 35 which is urged in a clockwise direction (Fig. 4) by a spring 36 having parts which are coiled around the pin 34 (Fig. 3) and having a bale or yoke 37 bearing against the lever 35 and a yoke 38 bearing against the lever 32. The spring 36 urges a stop screw 39 against a lug 40 of lever 32. The position of screw 39 relative to lever 35 can be locked in adjusted position by a nut 41.

Lever 35 carries a pin 42 pivotally connected with a link comprising a portion 43, a turnbuckle 44 and a portion 45 pivotally connected by a pin 46 with a lever 47. A spring 46a connecting pin 46 with the cover 14 urges the levers 47 and 32 counterclockwise. Lever 47 is supported by a pin 48 and connected at its lower end by pin 49 with a valve 50 slidable in a guide 51 provided by the case 10 and having lands 52 and 53 which control the distribution of pressure oil from an inlet port 54 to outlet ports 55 and 56 connected, respectively, with opposite ends of a cylinder 57 containing a piston 58 connected by rod 59 with a head 60 having a slot 61 receiving a pin 62 carried by the lever 21. A spring 63 confined between the piston 58 and the cover 14 urges the piston 58 toward the right. The pin 48 which supports lever 47 is carried by a bridge 65 supported by the free ends of metal bellows 66 and 67 whose fixed ends are attached to cover 14 and to a partition 68 provided by the case 10. The bellows 66 is evacuated. The interior of bellows 67 is in communication with the engine intake by means of a duct 69 within the case 10 which is connected by pipe 70 exterior to the case 10 (Fig. 1) and connected with the engine intake, not shown. Oil from a pressure source is connected by pipe 71 with the port 54 (Fig. 4). Since the bellows 66 and 67 have equal areas, variations in altitude pressure do not affect the position of the pin 48. Coiled springs, not shown, are located within the bellows 66 and 67 and are so constructed and calibrated that the relation between engine intake pressures and positions of the pin 48 is a linear relation. For details of the springs within the bellows reference is made to the copending application of Dolza et al, Serial No. 449,918, filed July 6, 1942 and now forfeited.

In Fig. 4, the cam plate 23 is shown in position for lowest pressure selection, lever 25 being in the position shown in Fig. 1. Bellows 67 is somewhat collapsed and bellows 66 is somewhat expanded. Valve 50 is located so as to connect ports 54 and 55 thereby admitting pressure fluid to the left of piston 58. Movement of lever 25 counterclockwise into a position for selecting pressure suitable for flight causes the cam plate 23 to move into position for selecting a higher pressure. As plate 23 moves counterclockwise it carries with it the pin 22 which supports the lever 21. Assuming that the pin 62 is restrained by slot 61, counterclockwise movement of pin 22 causes lever 21 to move clockwise, thereby causing lever 18, shaft 16 and lever 17 to move clockwise to effect an opening movement of the throttle valve in response to movement of the manually operated control lever 25. As cam plate 23 moves counterclockwise, the roller 31 follows the cam due to the action of spring 46a. Valve 50 moves toward the right to connect ports 54 and 56 and to connect port 55 with the interior of the case 10. Admission of pressure oil to the right of piston 58 causes it to move left, thereby moving lever 21 further in a clockwise direction. As lever 21 thus moves, the throttle operating lever 17 moves counclockwise to effect what further opening movement of the throttle is required to maintain the selected pressure. Fig. 5 shows the positions of the parts when the cam plate has been moved to the position for selecting the highest pressure. At critical altitude, the piston 58 moves to position 58' (Fig. 4) and causes lever 21 to move into such position that lever 18 moves into position 18' (Fig. 5), thereby causing the throttle valve to be fully opened. The mechanism is so constructed that for various positions of lever 25 and cam plate 23 selecting pressures suitable for flight, the throttle valve lever 17 will be moved to throttle wide open position 18' at altitudes which are critical when the engine is being supercharged by the main supercharger alone. More particularly, this is accomplished by the peculiar shape of the cam slot 20 in lever 21.

In order that selected pressures may be obtained at altitudes above those which are critical when the main supercharger is operating alone, the auxiliary supercharger is caused to operate automatically in a manner such as to increase the supercharging effect. Normally, the auxiliary supercharger operates at an idling speed such that it will offer a minimum of resistance to the flow of air or fuel mixture to the engine. This auxiliary supercharger is not shown in the drawings but it will be understood that it can be one which is connected with the engine through a variable ratio hydraulic coupling such as disclosed in the copending application of Dolza et al., Serial No. 520,878, filed February 3, 1944, now Patent No. 2,491,482 granted December 20, 1949. This auxiliary supercharger is driven by a tubular shaft 80 (Fig. 4) journaled in a bearing 81 and connected with an hydraulic coupling driven member 82 which cooperates with a driving coupling member 83 attached to a shaft 84 journaled in the housing 85 of the hydraulic coupling. Shaft 84 is connected with an engine driven shaft not shown. Engine driven oil-pump P forces pressure oil through a pipe 86 to the bearing 81, and thence it flows to the tubular shaft 80 for the purpose of filling the coupling members and the shroud 87 which is attached to the coupling member 83. The coupling ratio is determined by the rotative level of fluid within the shroud 87 and within the coupling members 82 and 83. This rotative level is determined by the position of a scoop 88 of tubular construction and having an inlet slot at 89 and an outlet slot at 90 from which oil can escape to a drain through a port 91 of the coupling housing 85. Slot 90 receives the end of a screw 92 which prevents rotation of the scoop 88 as it moves longitudinally in a bearing 93 provided by housing 85. If the scoop 88 is in the position shown, the rotating level of oil in the coupling members will be at a relatively great distance radially from the axis of the coupling; that is, the level will be low and the coupling ratio will be low and the slip percentage will be high. Therefore the shaft 80 will rotate at a low speed relative to the shaft 84. This is the condition for the idling operation of the auxiliary supercharger which therefore does not consume much power while the main supercharger alone is able to supply the demanded intake pressures. When altitudes are reached such that the main supercharger can no longer supply the pressures demanded, the scoop 88 is caused automatically to move toward the left to increase the depth of the oil within the coupling by decreasing the radial distance from the axis of the coupling to the rotative oil level within the coupling. The scoop 88 is moved left by hydraulic pressure. For this purpose, the scoop 88 is connected with a head of a rivet 94 attached to a piston 95 received by a cylinder 96 attached to the coupling housing 85. The cylinder 96 is attached to a cap 97. A spring 98 is confined between the cap 97 and the piston 95 and urges the piston toward the right. Cap 97 is connected by a pipe 99 with the left end of cylinder 57 of the pressure regulator. Pressure oil is conducted to the right side of piston 95 by passage 100 in a block 101 attached to or integral with cylinder 96. In passage 100 there is located the end of a flow metering screw 102 which can be locked in adjusted position by a nut 103. Passage 100 is connected by pipe 104 with a port 105 in the side of cylinder 57. Port 105 is so located that it will be at the right of piston 58 when the latter has moved into position for effecting full opening of the throttle. When altitudes are reached sufficient that demanded pressure cannot be supplied by the main supercharger alone, the piston 58 will have been moved toward the left past the port 105 so as to open the throttle valve fully. Since the pressure demanded cannot be supplied, the valve 50 will remain in such position as to connect ports 54 and 56 while connecting port 55 with drain d through the regulator case. Therefore pipe 99 will be connected with drain by port 55, and passage 100 and pipe 104 will be connected with port 54. Therefore the piston 95 and scoop 88 will move left to increase the coupling ratio and the auxiliary supercharger will so operate at higher speed to boost the pressure so that the demanded pressure can be supplied. If the demanded pressure is over-supplied, the valve 50 will be moved left so as to connect ports 54 and 55 and to connect port 56 with drain. Therefore the left side of piston 95 will be connected with port 54 while the right side is connected with drain through passage 100, pipe 104, cylinder 57 and port 56. Therefore the scoop 88 will move in to decrease the coupling ratio whereupon the speed of the auxiliary supercharger will decrease so that it will not operate any faster than necessary to maintain the demanded pressure. Obviously, as altitude increases, the scoop 88 will move toward the left in order to increase the coupling ratio to its maximum beyond which there can be no further supercharging effect; and an altitude will then have been reached which is critical for operation of both main and auxiliary superchargers.

For rapid acceleration of the speed of the auxiliary supercharger, it may be desirable to increase the rate of filling the hydraulic coupling. This may be accomplished by the use of an additional fluid pressure source such as an accumulator 110 connected by pipe 110a with engine oil pressure. A restriction 110b in pipe 110a prevents appreciable loss of engine oil pressure while filling the accumulator. The accumulator is connected with a valve port 111 controlled by valve 112 sliding in a guide 113 extending from a cylinder 114 containing a piston 115 connected with the valve 112. A spring 116 urges the piston 115 toward the left in a position which normally closes the port 112. The left end of cylinder 114 is connected by pipe 117 with pipe 104 and the right end of cylinder 114 is connected by pipe 118 with passage 100. While the fluid pressures on the opposite ends of the cylinder 114 are substantially equal, the spring 116 will hold the valve 112 in the position shown. As a result of a sudden demand for increase in manifold pressure beyond that which can be obtained by the main supercharger alone, the piston 58 moves rapidly to the position 58', thereby opening the port 105 quickly, then pressure on the left side of the piston 115 will exceed that on the right and the valve 112 will be moved to the right so as to connect accumulator discharge port 111 with pipe 119 leading to the shaft bearing 81 and thence to the hydraulic coupling.

The deceleration of the auxiliary supercharger may be relatively slow or fast depending on certain conditions. If the pressure-boost by the auxiliary supercharger is slightly in excess of that required to meet the demand when the throttle is wide open, instead of the throttle valve closing to reduce the excess, the scoop 88 may creep to the right. This may occur because the pressure caused by the load of spring 98 on piston 95 is greater than the pressure caused by the load of spring 63 on piston 58. If the excess of boost is such as to require slight closing movement of the throttle valve, the piston 58 will move right temporarily to close port 105. Piston 95 will creep to the right due to leakage and spring load. If the required closing movement of the throttle is greater, piston 58 will move to the right of port 105 so that the left end of cylinder 57 is connected with pipes 99 and 104, piston 95 will move to the right fairly rapidly as flow through passage 100 is restricted only by metering pin 102.

The pressure regulator is provided with means under the joint control by altitude pressure and by mixture temperature for preventing the attainment of such pressure as would cause engine detonation, although the main control lever 25 might be moved to a position demanding such high pressures. For this purpose the screw 33 (Fig. 3) supports a hub of a lever 120 carrying an adjustable stop screw 121 adapted to engage the lever 32 under certain conditions, thereby preventing the follower roller 31 from following the cam surface 30 into high pressure selecting positions. Lever 120 is connected by a link 122 with a clevis 123 connected by pin 124 with lever 125 connected by a pin 126 with a rod 127a threadedly connected with the free end of an aneroid bellows 127 located in a chamber 128 which can be connected with the airplane air scoop by a pipe 129 (Fig. 1). Therefore the bellows 127 is under control by altitude pressure. For convenience in assembly, the bellows 127 may be mounted on a plug 130 which can be threaded into the bottom wall of the chamber 128.

Lever 125 carries a pin 131 received by the forked end of a lever 132 journaled on a screw 133 threaded into the case 10, the attachment being made accessible upon the removal of a plug 134. Cover 14 provides a tubular portion 135 engaged by seal rings 136 retained by grooved collars 137 attached to an outer tube 138 whose left end is attached to a ring 139 which is attached to an inner tube 140. A spring 141 urges the ring 139 and hence the tubes 138 and 140 toward the right. The right end of tube 138 strikes against a partition 142, thus sealing that end of said tube. The right end of tube 140 is attached to a plug 143 slidable through a tubular boss 144 of a partition 142 in case 10, said plug 143 having a seal ring 145 received by its annular groove. The right end of plug 143 provides a slot 146 for receiving an arm of the lever 132.

Referring to Fig. 1, fuel-air mixture or air is conducted from the engine induction system by a pipe 150 leading through the opening 151. The mixture flows right through the tube 140, through passages 152 and through the space between the tubes 140 and 138 and out through the passages 153 to a passage 154 connected by a pipe 155 (Fig. 1) with the engine intake. The temperature of the tubes 138 and 140 responds to the temperature of the fuel mixture or air being conducted to the engine intake. Tube 138 is made of metal, such as Invar, having relatively low temperature coefficient of expansion and the tube 140 is made of metal, such as aluminum, having a relatively high coefficient. Therefore, there is an appreciable relative movement between the tubes 140 and 138. As tube 138 expands, its right end being fixed, its left end will move slightly toward the left; but, since tube 140 has greater temperature coefficient of expansion, the right end of tube 140 will move appreciably relative to the right end of tube 138. This movement is transmitted by the lever 132 to the rod 122 and thence to the lever 120. Rod 122 passes through a bracket 160 having a spring retainer boss 161 upon which is seated a spring 162 pressing up against a spring seat washer 163 attached to the rod 122. The spring 162 urges the lever 125 counterclockwise and lever 132 clockwise. Hence lever 132 is maintained in engagement with the right wall of slot 146 of block 143.

As mixture temperature increases, block 143 moves toward the right and the lever 132 follows along due to the action of spring 162. Therefore lever 120 moves clockwise and the stop screw 121 moves toward lever 32, thereby limiting the extent to which the lever 32 can move counterclockwise whereby the extent to which the roller 31 can follow the cam surface 30 is limited. Likewise, as altitude pressure decreases, bellows 127 expands, thereby moving lever 125 clockwise relative to its pivot 131, thereby raising the rod 122 and causing lever 120 to move clockwise. Thus the stop screw 121 is under joint control by mixture temperature responsive means and by altitude pressure responsive means whereby lever 32 is prevented from moving into such position of pressure selection as would cause the engine to detonate.

On a warm day the pressure selection would be less than on a cold day; and, at a higher altitude, the pressure selection would be less than at a lower altitude. Although the altitude responsive means does move more or less slowly, depending on how fast the altitude changes, alone it has no control over detonation. Detonation control at any altitude depends on how rapidly the thermostat can follow increasing mixture temperature. It should be made clear that the direct effect of altitude on detonation which the altitude responsive means attempts to control is different from the indirect effect of altitude on detonation through changing mixture temperature. The thermostat alone would take care of the indirect effect of altitude on detonation through changing mixture temperature. The direct effect of altitude on detonation is through reduction of exhaust back pressure with increase in altitude. Thus at a given fuel-air mixture temperature the effect of a lower exhaust back pressure is to reduce the detonation limit (i. e. manifold pressure at which incipient detonation occurs). This effect of exhaust back pressure on the detonation limit is slight at low altitude; the effect increases as altitude increases until it is very apparent near the critical altitude.

Whereas the engine will detonate at certain pressures when mixture temperature exceeds a certain amount or when pressure altitude exceeds a certain amount, the engine will operate without detonation at these same pressures provided liquid injection is used for cooling the mixture by spraying into the mixture conduit a jet of alcohol water mixture. The means for supplying alcohol water mixture under pressure to a spray nozzle is caused to operate a fluid pressure responsive means for retracting the lever 120 in a counterclockwise direction from lever 32 so that the pressure limiting means is rendered non-effective. For this purpose the right wall of the case 10 is provided with an opening 170 closed by a diaphragm 171 which serves also as a gasket between a cap 172 and the outer wall of the case 10. The chamber 173 between the cap 172 and the diaphragm 171 is connected by a pipe 174 with the alcohol-water pressure source. When this pressure is strong enough to overcome the spring 162, the diaphragm 171 and the rod 171a connecting it with lever 120 will move toward the left, thereby causing lever 120 to move counterclockwise to move the stop screw 121 far enough away from the lever 32 to permit obtaining the highest pressure of which the apparatus is capable of selection. Fig. 5 shows cam plate 23 in the position of highest pressure selection and the roller 31 is still following the cam surface 30 since screw 121 has moved far enough to the left to permit such movement of lever 32. As rod 122 moves down under the action of fluid pressure against the right of diaphragm 171, lever 125 moves clockwise and lever 132 moves counterclockwise, said movement of the latter being unobstructed since the slot 146 is wide enough to permit movement of lever 132 counterclockwise, although the plug 143 may not move. Spring 162 should be stronger than spring 46a so as to prevent counterclockwise movement of lever 32 after it engages stop screw 121; but spring 162 should be weak enough to be overcome by the minimum fluid (alcohol-water) pressure acting on the diaphragm 171.

From the foregoing description, it is apparent that the present invention provides for sequential operation of the engine throttle valve and the hydraulic coupling scoop. The pressure regulator causes the throttle valve to open wide at critical altitude for operation with the engine-stage supercharger. Then the scoop moves to increase the speed of the auxiliary supercharger. If the intake pressure exceeds the demand, the throttle valve closes and then the scoop moves to decrease supercharger speed to reduce the pressure excess. The invention provides for enclosure of movable parts except for the main control lever and the throttle operating lever. At critical altitude, the throttle valve is substantially wide open when the pressure selections range from those required for cruising up to maximum. Adjustments of lengths of upper arm of lever 32 and of link 43—44—45 and the location of stop screw 121 can be made while the level of the oil submerging the bellows 66—67 is up to the top of partition 68. Such adjustments are accessible by movement of the upper side-cover 12B. The invention provides means for limiting obtainable pressures to values such that the engine does not detonate when running dry (without liquid injection), said means being under joint control by altitude and by mixture temperature. The said limiting means is overridden (rendered non-effective), when an anti-detonant (alcohol-water spray) is used.

While the embodiment of the present invention as herein disclosed, constitutes a preferred form, it is to be understood that other forms might be adopted, all coming within the scope of the claims which follow.

What is claimed is as follows:

1. Apparatus for controlling the intake pressure of a supercharged internal combustion engine comprising a member for actuating a throttle valve in the engine induction passage, a servomotor for operating said member, a device responsive to altitude pressure, a device responsive to the temperature of the engine operating medium, a manually positioned part, pressure selecting means under control by said devices and part, an element responsive to engine intake pressure and means under control by the pressure selecting means and by the element for controlling the servomotor.

2. Apparatus for controlling the intake pressure of a supercharged internal combustion engine comprising a member for actuating a throttle valve in the engine induction passage, a servomotor for operating said member, a device responsive to altitude pressure, a device responsive to the temperature of the engine operating medium, a device responsive to the attainment of a certain pressure of a liquid injected into the engine induction passage, a manually positioned part, pressure selecting means under control by said devices and part, an element responsive to engine intake pressure and means under control by the pressure selecting means and by the element for controlling the servomotor.

3. Apparatus for controlling the intake pressure of a supercharged internal combustion engine comprising a member for actuating a throttle valve in the engine induction passage, a servomotor for operating said member, a device responsive to altitude pressure, a device responsive to the temperature of the engine operating medium, an element responsive to engine intake pressure, a manually operable part, pressure selecting means operated by said part, means under joint control by said devices for modifying the action of the pressure selecting means so as to limit the obtainable pressure to a value less than can be demanded by manual operation, and means under control by said element and by said pressure selecting means for controlling the servomotor.

4. Apparatus for controlling the intake pressure of a supercharged internal combustion engine comprising a member for actuating a throttle valve in the engine induction passage, a servomotor for operating said member, a device responsive to altitude pressure, a device responsive to the temperature of the engine operating medium, an element responsive to engine intake pressure, a manually operable part, pressure selecting means operated by said part, means under joint control by said devices for modifying the action of the pressure selecting means so as to limit the obtainable pressure to a value less than can be demanded by manual operation, a third device responsive to the attainment of a certain pressure of a liquid injected into the engine induction passage for nullifying the modifying action of the two devices first mentioned, and means under control by said element and by said pressure selecting means for controlling the servomotor.

5. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, a device responsive to altitude pressure, a device responsive to the temperature of the engine operating medium and means under joint control by the devices for positioning the stop.

6. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, a device responsive to altitude pressure, a device responsive to the temperature of the engine operating medium, means under joint control by the devices for positioning the stop, and means including a diaphragm operable to position the stop independently of the devices when the pressure of an injection fluid attains a certain value.

7. Apparatus for controlling the intake pressure of a supercharged internal combustion engine comprising a member for actuating a throttle valve in the engine induction passage, a servomotor for operating said member, a device responsive to altitude pressure, a device responsive to the attainment of a certain pressure of a liquid injected into the engine induction passage, a manually positioned part, pressure selecting means under control by said devices and part, an element responsive to engine intake pressure and means under control by the pressure selecting means and by the element for controlling the servomotor.

8. Apparatus for controlling the intake pressure of a supercharged internal combustion engine comprising a member for actuating a throttle valve in the engine induction passage, a servomotor for operating said member, a device responsive to altitude pressure, an element responsive to engine intake pressure, a manually operable part, pressure selecting means operated by said part, means controlled by said device for modifying the action of the pressure selecting means so as to limit the obtainable pressure to a value less than can be demanded by manual operation, a second device responsive to the attainment of a certain pressure of liquid injected into the engine induction passage for nullifying the modifying action of the device first mentioned, and means under control by said element and by said pressure selecting means for controlling the servomotor.

9. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, a device responsive to altitude pressure for positioning the stop, and means including a diaphragm operable to position the stop independently of the device when the pressure of an injection fluid attains a certain value.

10. Apparatus for controlling the intake pressure of a supercharged internal combustion engine comprising a member for actuating a throttle valve in the engine induction passage, a servomotor for operating said member, a device responsive to the temperature of the engine operating medium, a device responsive to the attainment of a certain pressure of a liquid injected into the engine induction passage, a manually positioned part, pressure selecting means under control by said devices and part, an element responsive to engine intake pressure and means under control by the pressure selecting means and by the element for controlling the servomotor.

11. Apparatus for controlling the intake pressure of a supercharged internal combustion engine comprising a member for actuating a throttle valve in the engine induction passage, a servomotor for operating said member, a device responsive to the temperature of the engine operating medium, an element responsive to engine intake pressure, a manually operable part, pressure selecting means operated by said part, means controlled by said device for modifying the action of the pressure selecting means so as to limit the obtainable pressure to a value less than can be demanded by manual operation, and a second device responsive to the attainment of a certain pressure of liquid injected into the engine induction passage for nullifying the modifying action of the device first mentioned, and means under control by said element and by said pressure selecting means for controlling the servomotor.

12. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, a device responsive to the temperature of the engine operating medium for positioning the stop, and means including a diaphragm operable to position the stop independently of the device when the pressure of an injection fluid attains a certain value.

13. Apparatus for controlling the intake pressure of a supercharged internal combustion engine comprising a member for actuating a throttle valve in the engine induction passage, an hydraulic servomotor for operating said member, a pressure selecting device, an element responsive to engine intake pressure, means under control by the device and element for controlling the servomotor so that it will so position the throttle valve as to maintain a selected pressure, a movable part for controlling the speed ratio of a transmission between the engine and a supercharger, an hydraulic servomotor for operating said part, and means whereby the second mentioned servomotor is caused to receive fluid under pressure in response to a predetermined operation of the first servomotor, and thereby to effect the increase of supercharger speed upon the movement of the throttle valve to a certain open position.

14. Apparatus for controlling the intake pressure of a supercharged internal combustion engine comprising a member for actuating a throttle valve in the engine induction passage, an hydraulic servomotor comprising a cylinder and a piston within the cylinder and connected with said member, a valve for controlling the distribution of pressure fluid to the ends of the cylinder, a pressure selecting device, an element responsive to engine intake pressure, means under control by the device and element for controlling the valve of the servomotor so that the servomotor will so position the throttle valve as to maintain a selected pressure, a movable part for controlling the speed ratio of a transmission between the engine and a suprcharger, a second hydraulic servomotor comprising a cylinder and a piston therein and connected with said part, and ducts respectively connecting the ends of the cylinders of the hydraulic motors, said ducts providing ports in the cylinder of the first hydraulic motor which are controlled by the piston thereof.

15. Apparatus according to claim 14 further characterized by the inclusion of a flow metering valve in the duct which connects the cylinder of the first servomotor with that end of the cylinder of the other servomotor away from which the piston of said other servomotor moves when operating to increase the speed ratio of the transmission.

16. Apparatus according to claim 14 further characterized by the inclusion of springs located respectively in the cylinders of the servomotors, one spring operating to resist movement of the piston of the first servomotor in the throttle-valve-opening direction, the other spring operating to resist movement of the piston of the second servomotor in the transmission-speed-ratio-increasing direction.

17. Apparatus according to claim 14 further characterized by the inclusion of springs located respectively in the cylinders of the servomotors, one spring operating to resist movement of the piston of the first servomotor in the throttle-valve-opening direction, the other spring operating to resist movement of the piston of the second servomotor in the transmission-speed-ratio-increasing direction and by the inclusion of a flow metering valve in the duct which connects the cylinder of the first servomotor with that end of the cylinder of the other servomotor away from the piston of said other servomotor moves when operating to increase the speed ratio of the transmission.

18. Apparatus according to claim 14 further characterized by the fact that the part operated by the second servomotor controls the rotative oil level in an hydraulic fluid coupling drive which provides the variable speed-ratio transmission between the engine and a supercharger and further characterized by the inclusion of a flow metering valve in the duct which connects the cylinder of the first servomotor with that end of the cylinder of the other servomotor away from which the piston of said other servomotor moves when operating to increase the speed ratio of the transmission, and further characterized by the provision of means responsive to the attainment of a predetermined pressure drop across the flow metering valve for effecting an accelerated filling of the fluid coupling.

FRANK W. KERFOOT.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,383,563 | Pugh et al. | Aug. 28, 1945 |
| 2,388,669 | Baker | Nov. 13, 1945 |
| 2,392,565 | Anderson et al. | Jan. 8, 1946 |
| 2,397,984 | Schorn | Apr. 9, 1946 |
| 2,400,306 | Hobbs | May 14, 1946 |
| 2,403,398 | Reggio | July 2, 1946 |
| 2,422,808 | Stokes | June 24, 1947 |

FOREIGN PATENTS

| Number | Country | Date |
|---|---|---|
| 119,567 | Australia | Apr. 13, 1943 |